No. 773,473. PATENTED OCT. 25, 1904.
H. R. CASSEL.
FILTERING APPARATUS.
APPLICATION FILED JULY 15, 1904.
NO MODEL. 2 SHEETS—SHEET 2.
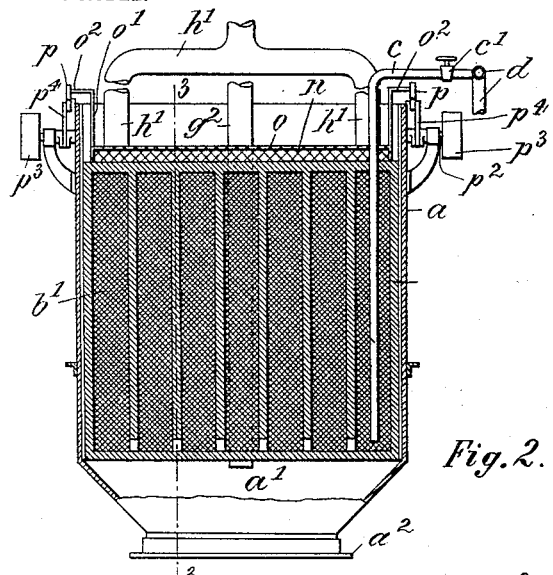
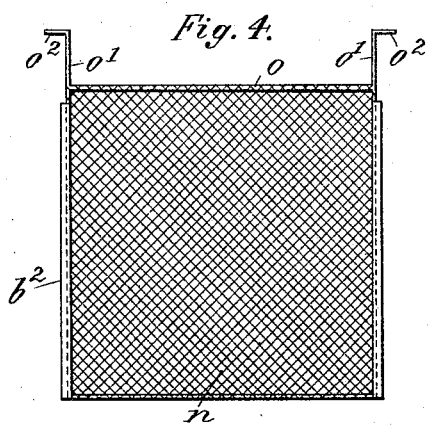
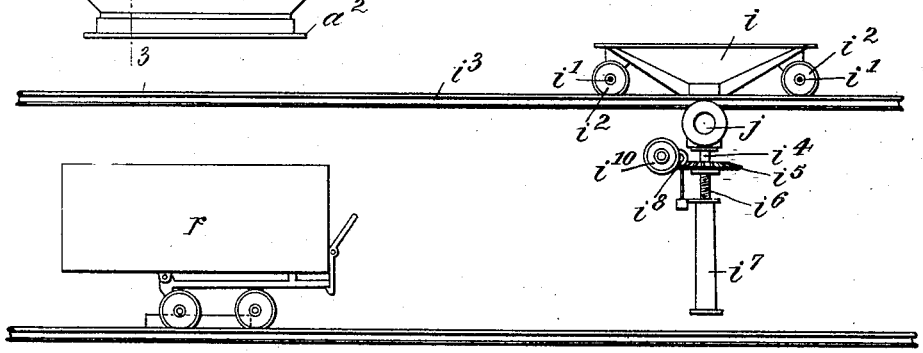
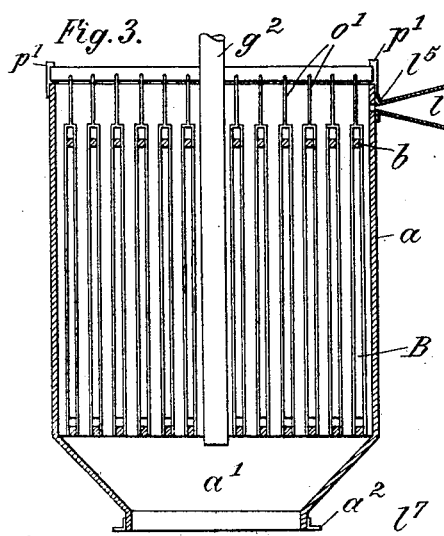
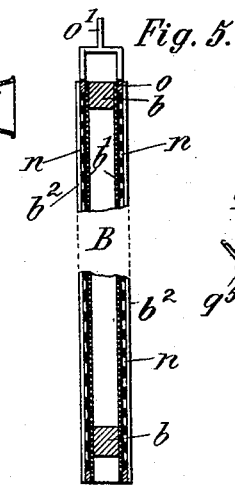
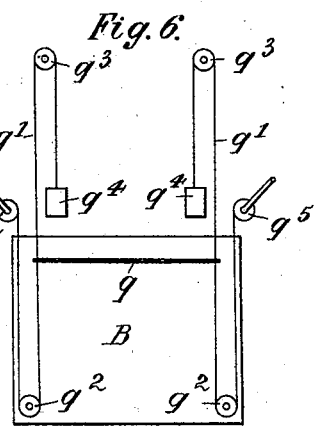
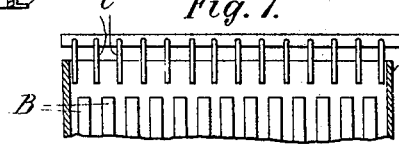
Witnesses:
Inventor:
Henry R Cassel No. 773,473. Patented October 25, 1904.

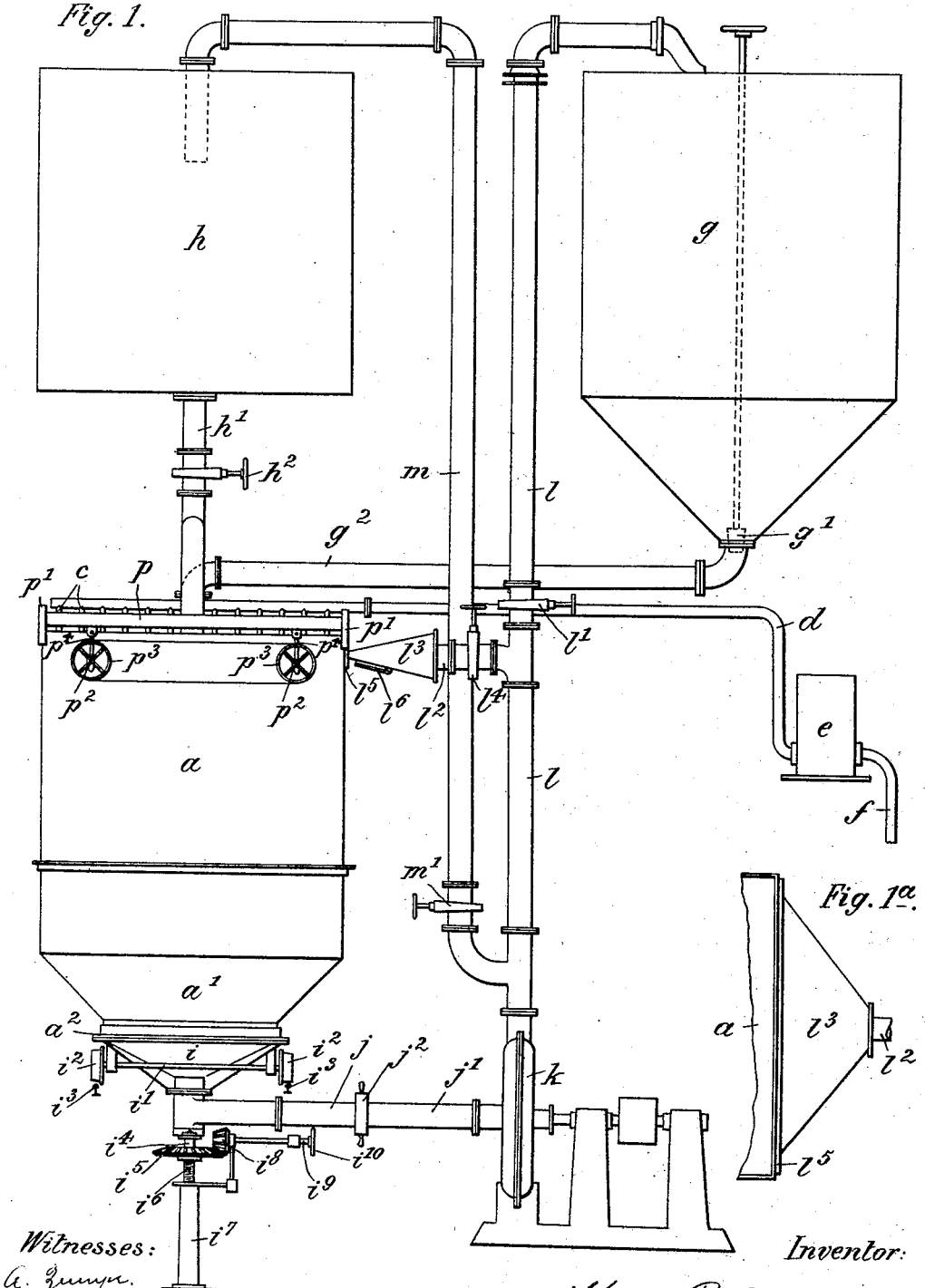

UNITED STATES PATENT OFFICE.

HENRY R. CASSEL, OF COLORADO SPRINGS, COLORADO.

FILTERING APPARATUS.

SPECIFICATION forming part of Letters Patent No. 773,473, dated October 25, 1904.

Application filed July 15, 1904. Serial No. 216,641. (No model.)

*To all whom it may concern:*

Be it known that I, HENRY R. CASSEL, a citizen of the United States, residing at Colorado Springs, Colorado, have invented new and useful Improvements in Filtering Apparatus, of which the following is a specification.

This invention relates to an apparatus for extracting the values from slimes in a simple and efficient manner.

In the accompanying drawings, Figure 1 is a front elevation of my improved apparatus; Fig. 1$^a$, a detail of the pulp-distributer; Fig. 2, a sectional elevation of parts of the apparatus, showing the bottom of the filtering-tank open; Fig. 3, a cross-section through the filtering-tank on line 3 3, Fig. 2; Fig. 4, a side view of a filter-cell, showing the pulp-detacher; Fig. 5, an enlarged vertical cross-section thereof; Fig. 6, a side view of a modification of the pulp-detacher, and Fig. 7 a detail of a modification of the pulp-distributer.

The letter $a$ represents a filtering-tank, the coniform bottom $a'$ of which is provided with a flange $a^2$. Within tank $a$ are fitted a number of filter-cells B, each composed of a rigid skeleton $b$ and a surrounding filter $b'$, formed of filter-cloth, perforated metal, or other material. Into the upper end of each cell B, Fig. 2, enters a tube $c$, having cock $c'$, and extending with its lower end to a point slightly above the bottom of the cell. At their upper ends the tubes $c$ are connected to a common suction-pipe $d$, which is closed at one end and communicates at its other end with a suction-pump $e$, that by pipe $f$ delivers the filtrate to a suitable solution-tank. (Not shown.)

$g$ is the pulp-tank, having valve $g'$ and communicating by pipe $g^2$ with the lower end of filtering-tank $a$. A water-tank $h$ also communicates by pipe $h'$, having cock $h^2$, with tank $a$.

Against the bottom flange $a^2$ of tank $a$ fits a vertically-movable and laterally-displaceable tapering bottom or door $i$. This door is provided with a pair of axles $i'$, carrying traction-wheels $i^2$, that travel on a track $i^3$. To the door $i$ is secured the removable section $j$ of a pulp-discharge pipe, which may be connected to the fixed section $j'$ of said pipe by a suitable coupling $j^2$. Below pipe-section $j$ there depends from door $i$ a rotatable arbor $i^4$, carrying fast bevel-wheel $i^5$. The lower threaded end $i^6$ of arbor $i^4$ is tapped into a stand $i^7$, the whole constituting a lifting-jack. The bevel-wheel $i^5$ is engaged by a wheel $i^8$, the spindle $i^9$ of which has a handle $i^{10}$. If the handle $i^{10}$ is turned in one direction, the door $i$ is raised against flange $a^2$ to close tank $a$. In this position the wheels $i^2$ are slightly raised off track $i^3$, Fig. 1. If the handle is turned in the other direction, the door is lowered until the wheels $i^2$ redescend upon track $i^3$.

The discharge-pipe $j j'$ communicates with a centrifugal pump $k$, which in turn communicates with a pipe $l$. This pipe has a cock $l'$ and opens into pulp-tank $g$. Below cock $l'$ there extends from pipe $l$ a branch $l^2$, having a pulp-distributer or nozzle $l^3$ and cock $l^4$. The nozzle $l^3$ is made of tapering or triangular form in cross-section, Fig. 1$^a$, and may be provided with a door $l^6$ to permit cleaning and the removal of obstructions. The upper and lower sides of nozzle $b^3$ converge toward the front, where they form a long narrow discharge-slit. The nozzle opens into the top of tank $a$ above the cells B and is connected to the wall of the tank by suitable flanges $l^5$, Fig. 3. By means of this nozzle the pulp is distributed evenly over the filtering-cells B.

Fig. 7 illustrates a modification of the pulp-distributer. Here the nozzle $l^3$ is dispensed with, while the branch $l^2$ of pipe $l$ is extended along the top of tank $a$. From branch $l^2$ project a number of nipples $l^7$, so arranged that the pulp is delivered above, but between cells B.

A pipe $m$, having cock $m'$, communicates with pipe $l$ and opens into water-tank $h$.

Flat against each side of cell B is placed a vertically-movable mantle or pulp-detacher $n$, which may be formed of a coarse-wire screen or other material adapted to cut the pulp. This screen may be moved up and down along the cell and may be slightly agitated to completely sever the pulp from the cell. In order to guide the screen during its movement, the cell B may be provided with guide-rails $b^2$. Suitable means may be provided for imparting the required movement to the mantle. The drawings show the mantles fitted in rectangular frames $o$, which are provided with hangers $o'$, having bent ends $o^2$. These ends are received by a pair of perforated rails $p$, engaging guides $p'$, that project upwardly from the corners of tank $a$. Each of the rails $p$ may be vertically reciprocated to impart a corresponding motion to mantles $n$. The means for actuating rails $p$ are shown to consist of crank-shaft $p^2$, driven by pulleys $p^3$ and connected to rails $p$ by links $p^4$. Instead of using the mantles $n$ the detachers may be made in the form diagrammatically illustrated in Fig. 6. Here a scraper $q$, made of wire or a knife-blade, is placed against each side of the cells near the upper end thereof. The wire $q$ is attached to two suspending-wires $q'$, passing over sheaves $q^2$ $q^3$ and carrying at one end counterweights $q^4$. At their other ends the wires $q'$ engage a windlass $q^5$, the two windlasses thus required being intergeared, if desired. By manipulating the windlasses the wire $q$ will be drawn down to sever the cake deposited upon the side of cell B.

The operation is as follows: The pulp is discharged into tank $a$ to submerge cells B. The door $i$ is closed, the cocks $l'$ $m'$ are closed, and the cock $l^4$ is opened. The pump $e$ is started to draw the liquid from the pulp into cells B, from which it is carried to the solution-tank. In order to prevent the settling of the pulp at the bottom and to provide a circulation of the pulp between the cells, the centrifugal pump $k$ is also set in motion. This will cause the pulp to be withdrawn from the bottom of tank $a$ and to be redelivered to the tank at its top above cells B through nozzle $l^3$ or nipples $l'$. During this operation the pulp gradually thickens against the mantles $n$, additional pulp being supplied to always keep the cells immersed. When a layer of sufficient thickness has accumulated, the valve $l^4$ is closed and valve $l'$ opened, whereby the non-adhering pulp is lifted into the pulp-tank $g$. During this operation suction in cells B is maintained to prevent portions of the cakes from becoming detached. After the non-adhering pulp has thus been removed valve $l'$ is closed and valves $m'$ $h^2$ are opened to admit water into tank $a$ and wash out the values still contained in the cakes. These values will, by pump $e$, be drawn into cells B. When the values have been extracted, the valve $h^2$ is closed and the water is returned from tank $a$ through pump $k$ into tank $h$. The pump $k$ is now stopped and the coupling $j^2$ is opened. The door $i$ is lowered by turning handle $i^{10}$, so that the wheels $i^2$ will descend upon track $i^3$. The door $i$ is drawn by suitable means along the track away from tank $a$, a car $r$ is pushed under the tank, Fig. 2, and pump $e$ is stopped. The agitators $n$ or $q$ are set in motion to detach the cakes from the cells B and cause the detached fragments to fall into car $r$. If desired, the loosening of the cakes from the cells may be effected by pumping air into the latter.

In lieu of using the bevel-gear jack shown any other screw, hydraulic or pneumatic ram may obviously be employed.

What I claim is—

1. A filtering apparatus comprising a tank, inclosed filtering-cells, a suction-pump connected thereto, a bottom removably fitted to the tank, and means for withdrawing the pulp from said bottom and delivering it to the top of the tank, substantially as specified.

2. A filtering apparatus comprising a tank, inclosed filtering-cells, a suction-pump connected thereto, a removable bottom, means for raising and lowering the bottom, and means for withdrawing the pulp from said bottom and delivering it to the top of the tank, substantially as specified.

3. A filtering apparatus comprising a tank, inclosed filtering-cells, a suction-pump connected thereto, a removable bottom, a jack secured to said bottom, and means for withdrawing the pulp from said bottom and delivering it to the top of the tank, substantially as specified.

4. A filtering apparatus comprising a tank, inclosed filtering-cells, a suction-pump connected thereto, a removable bottom having wheels and a jack, a track adapted to be engaged by the wheels, and means for withdrawing the pulp from said bottom and delivering it to the top of the tank, substantially as specified.

5. A filtering apparatus comprising a tank, inclosed filtering-cells, a suction-pump connected thereto, a removable bottom having wheels and a jack, a track adapted to be engaged by the wheels, a discharge-pipe connected to the bottom, and means for withdrawing the pulp from said bottom and delivering it to the top of the tank, substantially as specified.

6. A filtering apparatus comprising a tank, inclosed filtering-cells, a suction-pump connected thereto, a pulp-distributer at the top of the tank, and means for connecting said distributer with the bottom of the tank, substantially as specified.

7. A filtering apparatus comprising a tank, inclosed filtering-cells, a suction-pump connected thereto, a pulp-distributer at the top of the tank, a removable bottom, means for raising and lowering the bottom, and means for connecting the bottom to the pulp-distributer, substantially as specified.

8. A filtering apparatus comprising a tank, inclosed filtering-cells, a suction-pump connected thereto, and a tapering nozzle having a discharge-slit which opens into the top of the tank, substantially as specified.

9. A filtering apparatus comprising a tank, inclosed filtering-cells, a suction-pump connected thereto, a tapering nozzle having a discharge-slit which opens into the top of the tank, and means for connecting the bottom of the tank to said nozzle, substantially as specified.

10. A filtering apparatus comprising a tank, a removable bottom having wheels, a track adapted to be engaged by the wheels, a movable discharge-pipe section secured to the bottom, a fixed discharge-pipe section adapted to be connected thereto, a nozzle entering the top of the tank, and means for connecting the fixed pipe-section to said nozzle, substantially as specified.

11. A filtering apparatus comprising a tank, inclosed filtering-cells, a suction-pump connected thereto, cutting-screens at the sides of the cells, and means for agitating the screens, substantially as specified.

12. In a filtering apparatus, the combination of a filtering-tank with inclosed filtering-cells, a suction-pump connected thereto, a pulp-tank, a water-tank, a removable bottom for the filtering-tank, a pipe for connecting said bottom with the pulp-tank, and a pulp-distributer communicating with the pipe and entering the top of the filtering-tank, substantially as specified.

13. A filtering apparatus comprising a pulp-tank, means within the tank for separating the liquid from the pulp by suction, means for discharging the liquid, means for withdrawing the pulp from said bottom and delivering it to the top of the tank, and means for discharging the solid residue through the bottom of the tank, substantially as specified.

Signed by me at Colorado Springs, Colorado, this 22d day of June, 1904.

HENRY R. CASSEL.

Witnesses:
CHARLES W. HAINES,
ELSIE STEVENSON.